United States Patent
Kalman et al.

(10) Patent No.: US 9,819,738 B2
(45) Date of Patent: Nov. 14, 2017

(54) ACCESS MANAGEMENT TECHNIQUES FOR STORAGE NETWORKS

(71) Applicant: NetApp, Inc., Sunnyvale, CA (US)

(72) Inventors: Dean Kalman, Cary, NC (US); Joseph R. Sunday, Apex, NC (US); Raj Lalsangi, Cary, NC (US)

(73) Assignee: NetApp Inc., Sunnyvale, CA (US)

( * ) Notice: Subject to any disclaimer, the term of this patent is extended or adjusted under 35 U.S.C. 154(b) by 729 days.

(21) Appl. No.: 14/163,067

(22) Filed: Jan. 24, 2014

(65) Prior Publication Data

US 2015/0169647 A1 Jun. 18, 2015

Related U.S. Application Data

(60) Provisional application No. 61/916,099, filed on Dec. 13, 2013.

(51) Int. Cl.
*H04L 29/08* (2006.01)
*G06F 17/30* (2006.01)

(52) U.S. Cl.
CPC .... *H04L 67/1097* (2013.01); *G06F 17/30194* (2013.01)

(58) Field of Classification Search
CPC .......................... G06F 17/30289; H04L 67/1097
See application file for complete search history.

(56) References Cited

U.S. PATENT DOCUMENTS

| | | | | |
|---|---|---|---|---|
| 6,421,711 B1* | 7/2002 | Blumenau | ............ | G06F 3/0605 709/213 |
| 7,161,935 B2* | 1/2007 | Alonso | ................... | H04L 29/06 370/384 |
| 2002/0186682 A1* | 12/2002 | Kawano | ................. | H04L 45/28 370/351 |
| 2007/0097880 A1* | 5/2007 | Rajsic | .................... | H04L 41/12 370/254 |
| 2013/0318228 A1* | 11/2013 | Raja | ..................... | G06F 3/0635 709/224 |
| 2014/0173232 A1* | 6/2014 | Reohr | .................. | G06F 3/0611 711/162 |

* cited by examiner

*Primary Examiner* — Robert Beausoliel, Jr.
*Assistant Examiner* — Susan F Rayyan
(74) *Attorney, Agent, or Firm* — LeClairRyan, a Professional Corporation

(57) ABSTRACT

Improved access management techniques for storage networks are described. In one embodiment, for example, an apparatus may comprise a processor circuit and an access control component for execution by the processor circuit to select a set of hosts for which to enable access to a logical storage volume of a network storage cluster, select, from among a plurality of nodes of the network storage cluster, a set of nodes via which to enable access to the logical storage volume by the set of hosts, and generate a storage configuration object comprising a parameter identifying the set of nodes. Other embodiments are described and claimed.

18 Claims, 7 Drawing Sheets

US 9,819,738 B2

ACCESS MANAGEMENT TECHNIQUES FOR STORAGE NETWORKS

RELATED CASE

This application claims priority to U.S. Provisional Patent Application No. 61/916,099, filed Dec. 13, 2013, the entirety of which is hereby incorporated by reference.

BACKGROUND

In a storage network such as a storage area network (SAN) cluster, abstraction techniques may be utilized in order to present physical storage locations of a plurality of storage nodes as a single virtual storage array. Such abstraction techniques may involve defining various logical interfaces that correspond to various physical ports of the storage nodes and presenting the logical interfaces to hosts as interchangeable paths via which to access logical storage volumes of the virtual storage array.

In some cases, the hosts that utilize the virtual storage array may be capable of properly handling only a limited number of paths to each logical storage volume. One approach to observing such limitations may involve the use of portsets, according to which static sets of logical interfaces may be specified for use by sets of hosts. However, in some implementations, the use of portsets may not enable logical interfaces to be assigned at a single-volume level of granularity, which may be problematic when mobility events occur according to which logical storage volumes are reassigned to different physical storage nodes.

DETAILED DESCRIPTION

Various embodiments may be generally directed to improved access management techniques for storage networks. In one embodiment, for example, an apparatus may comprise a processor circuit and an access control component for execution by the processor circuit to select a set of hosts for which to enable access to a logical storage volume of a network storage cluster, select, from among a plurality of nodes of the network storage cluster, a set of nodes via which to enable access to the logical storage volume by the set of hosts, and generate a storage configuration object comprising a parameter identifying the set of nodes. Other embodiments are described and claimed.

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include more or less elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrases "in one embodiment," "in some embodiments," and "in various embodiments" in various places in the specification are not necessarily all referring to the same embodiment.

Figure 1:
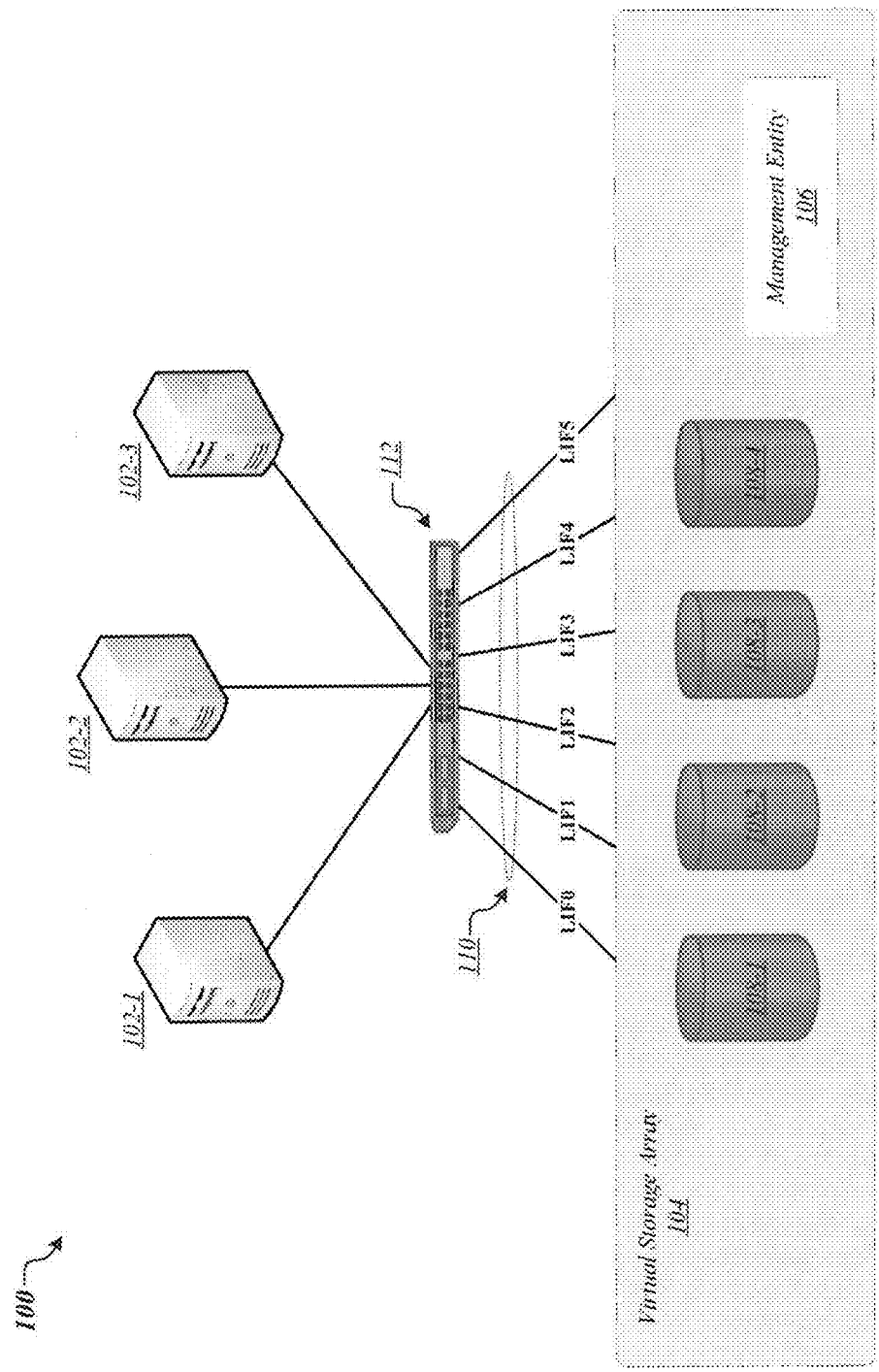
FIG. 1 illustrates one embodiment of a first operating environment.

FIG. 1 illustrates an embodiment of an operating environment 100 such as may be associated with various embodiments. While specific numbers of elements may be illustrated, it can be appreciated that more or less of each element may be used in particular implementations. As shown in FIG. 1, in operating environment 100, hosts 102-1, 102-2, and 102-3 are communicatively coupled to a virtual storage array 104. Virtual storage array 104 may comprise a network storage system that is controlled and/or managed by a management entity 106 in order to provide one or more logical storage volumes 108 for use by hosts 102-1, 102-2, and 102-3. More particularly, management entity 106 may be operative to implement virtual storage array 104 by applying various layers and/or types of abstraction to an underlying network of physical storage nodes and associated ports. For example, management entity 106 may be operative to implement virtual storage array 104 by abstracting the physical storage nodes and associated ports of a storage area network (SAN) cluster.

As shown in FIG. 1, hosts 102-1, 102-2, and 102-3 may access virtual storage array 104 through various logical interfaces (LIFs) 110, via a switch 112. In some embodiments, the various LIFs 110 may correspond to various ports residing at various network storage nodes. In various embodiments, for example, the various LIFs 110 may correspond to various small computer system interface (SCSI) ports of various storage nodes, and thus may correspond to various SCSI paths. In some embodiments, because of the abstraction provided by management entity 106, the physical ports, nodes, and/or other types of physical structure to which the various LIFs 110 correspond may not be apparent from the perspective of hosts 102. In other words, from the perspective of hosts 102, each LIF 110 may simply constitute a path to virtual storage array 104, rather than a path to any particular port and/or node within virtual storage array 104. However, in various embodiments, although the physical structure associated with various LIFs 110 may not be apparent to hosts 102, there may be various considerations arising from that physical structure that render particular LIFs 110 more suitable than others for use as paths to access particular logical storage volumes 108.

Figure 2:
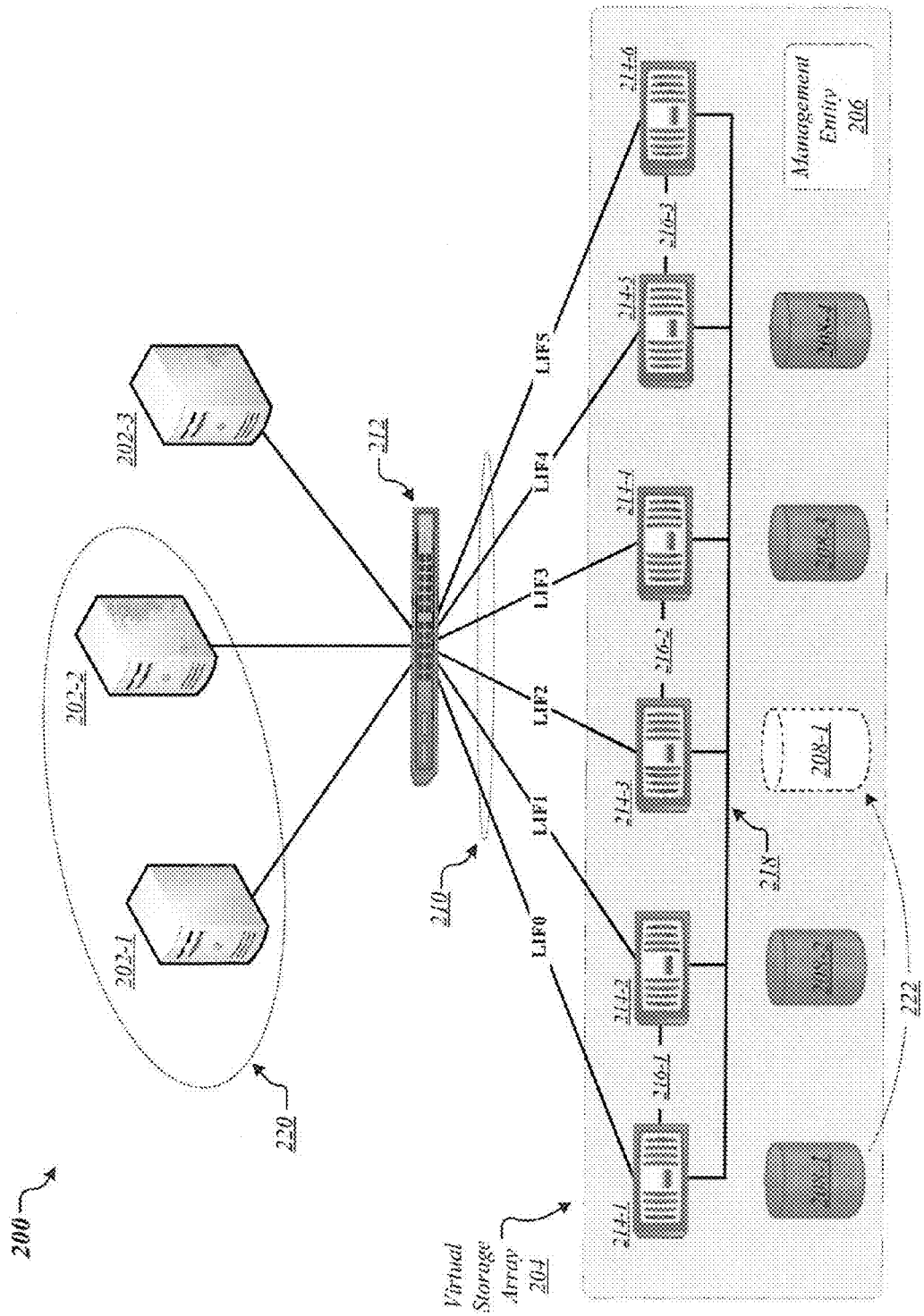
FIG. 2 illustrates one embodiment of a second operating environment.

FIG. 2 illustrates an exemplary embodiment of an operating environment 200. As shown in FIG. 2, virtual storage array 204 comprises a physical arrangement of storage nodes 214 and various interconnections, which is abstracted by management entity 206 in order to present virtual storage array 204 to various hosts 202. The various storage nodes 214 are arranged in high-availability pairs, each of which comprises two storage nodes 214 connected by a private heartbeat connection 216. Additionally, all of the storage nodes 214 are interconnected by a cluster interconnect 218. The various LIFs 210 in FIG. 2 comprise abstractions of physical ports associated with the various storage nodes 214. For example, LIF0 comprises an abstraction of a physical port associated with storage node 214-1. It is worthy of note that although management entity 206 is depicted as being external to the various storage nodes 216 of virtual storage array 204 in FIG. 2, the embodiments are not so limited. For example, in some embodiments, one or more of the storage nodes 216 may act as management entity 206. The embodiments are not limited in this context.

Although their associated physical structure may not be apparent from the perspective of hosts 202 due to the abstraction provided by management entity 206, the various LIFs 210 may in actuality be associated with different physical paths. For example, in FIG. 2, LIF0 may be associated with a port residing on storage node 214-1, while LIF5 may be associated with a port residing on storage node 214-6. Likewise, although particular logical storage volumes 208 of virtual storage array may not appear from the perspective of hosts 202 to have specific physical localities due to the abstraction provided by management entity 206, they may in actuality be associated with physical storage locations of particular storage nodes 214. For example, logical storage volume 208-1 may correspond to physical storage locations of storage node 214-1. The embodiments are not limited to these examples.

In various embodiments, due to the locality characteristics of LIFs 210 and/or logical storage volumes 208, particular LIFs 210 may be more or less optimal than others for use in accessing particular logical storage volumes 208. For example, in FIG. 2, LIF0 may comprise an optimized path to logical storage volume 208-1, because it corresponds to a port on storage node 214-1, which is the same storage node as that containing the physical storage locations to which logical storage volume 208-1 corresponds. In contrast, LIF5 may correspond to a port on storage node 214-6, and may thus require the use of cluster interconnect 218 to reach logical storage volume 208-1 at storage node 214-1. There may be added latency associated with communicating over cluster interconnect 218, and as such, LIF5 may comprise an unoptimized path. The embodiments are not limited in this context.

In some embodiments, management entity 206 may be operative to define various groups of hosts 202 and to map various logical storage volumes 208 to various such groups in order to grant them access to those logical storage volumes 208. For example, in FIG. 2, management entity 206 may be operative to define a host group 220 that comprises hosts 202-1 and 202-2, and may map logical storage volume 208-1 to the host group 220 such that hosts 202-1 and 202-2 are able to access logical storage volume 208-1. The embodiments are not limited to this example.

In various embodiments, it may be necessary and/or desirable to limit the number of LIFs 210 that are presented to each host 202 for accessing any particular logical storage volume 208. In some embodiments, each host 202 may be capable of properly handling up to a particular number of paths to any particular logical storage volume 208. For example, in FIG. 2, hosts 202-1 and 202-2 may each be capable of properly handling up to four paths to logical storage volume 208-1. Since there are a total of six LIFs 210 via which logical storage volume 208-1 may be accessed in FIG. 2, it may be desirable for management entity to restrict hosts 202-1 and 202-2 to a subset of no more than four LIFs 210 for use in accessing logical storage volume 208-1. The embodiments are not limited to this example.

In various embodiments, management entity 206 may be capable of restricting the LIFs 210 presented to various hosts 202 using portsets, each of which may comprise a configuration object identifying a set of LIFs 210. In some embodiments, management entity 206 may be capable of binding any particular portset to a host group, such that the hosts 202 of that host group are presented only with the LIFs 210 identified by the portset. For example, in FIG. 2, management entity 206 may be capable of generating a portset that identifies LIF0, LIF1, LIF4, and LIF5, and may be capable of binding that portset to host group 220 such that hosts 202-1 and 202-2 are presented only with LIF0, LIF1, LIF4, and LIF5. The embodiments are not limited to this example.

In various embodiments, when management entity 206 binds a portset to a host group, the hosts 202 of the host group may be restricted to the defined group of LIFs 210 with respect to access to all logical storage volumes 208 to which they have been granted access. In an example, management entity 206 may grant host group 220 access to logical storage volumes 208-1, 208-2, and 208-4 and may then use a portset to restrict host group 220 to using LIF0, LIF1, LIF4, and LIF5. In this example, hosts 202-1 and 202-2 may thus be restricted to this set of four LIFs 210 for use as access paths to logical storage volume 208-1 and also restricted to this set of four LIFs 210 for use as access paths to logical storage volumes 208-2 and 208-4. The embodiments are not limited to this example.

In some embodiments, hosts 202 may have one or more mechanisms at their disposal for differentiating between available LIFs 210 based on their suitability for accessing particular logical storage volumes 208. In various embodiments, for example, hosts 202 may utilize asymmetrical logical unit access (ALUA) procedure to classify available LIFs 210 as being optimized or unoptimized with respect to particular logical storage volumes 208. According to the ALUA procedure, each available LIF 210 that corresponds to a port at an owner node for a given logical storage volume 208 may be categorized as active/optimized with respect to that logical storage volume 208, and each available LIF 210 that corresponds to a port at another node may be categorized as active/unoptimized. Continuing with the above example in which host group 220 is restricted to using LIF0, LIF1, LIF4, and LIF5, hosts 202-1 and 202-2 may each use an ALUA procedure to identify LIF1 as an active/optimized path with respect to logical storage volume 208-2 and to identify each of LIF0, LIF4, and LIF5 as an active/unoptimized path with respect to logical storage volume 208-2. The embodiments are not limited to this example.

One drawback associated with the use of portsets to observe access path limits of hosts 202 may be that when mobility events occur, some hosts 202 may be left with only unoptimized paths to particular logical storage volumes 208. A mobility event may involve a logical storage volume 208 corresponding to physical storage at one storage node 214 being reassigned to correspond instead to physical storage at a different storage node 214. FIG. 2 depicts an example of a mobility event 222, according to which logical storage volume 208-1 may be reassigned from storage node 214-1 to storage node 214-3. In this example, if management entity 206 has defined a portset to restrict host group 220 to using LIF0, LIF1, LIF4, and LIF5, then all of the available paths from host 202-1 and 202-2 to logical storage volume 208-1 will become unoptimized paths. The embodiments are not limited to this example.

In some embodiments, it may be possible to modify a portset in order to provide host group 220 with an optimized path to a relocated logical storage volume 208. For example, in FIG. 2, it may be possible to modify the portset for host group 220 such that hosts 202-1 and 202-2 are able to access the moved storage volume on LIF2, which may be an optimized path to logical storage volume 208-1 following mobility event 222. However, in various embodiments, the procedure for modifying the portset may not be automatic, but rather may require manual steps in order for the relocated logical storage volume 208-1 to be discoverable through LIF2. Furthermore, since the path restrictions of the portset may apply to all logical storage volumes 208 to which the host group 220 has access, modifying the portset to create an optimized path to one logical storage volume 208 may leave the host group 220 with no optimized path to another logical storage volume 208. For example, if management entity 206 substitutes LIF2 and LIF3 for LIF0 and LIF1 in the portset for host group 220, hosts 202-1 and 202-2 may be provided with an optimized path to logical storage volume 208-1 following mobility event 222, but may no longer have an optimized path to logical storage volume 208-2. The embodiments are not limited to this example.

Disclosed herein are improved access management techniques for storage networks such as that depicted in operating environment 200 of FIG. 2. According to such improved techniques, the LIFs via which a given host group may access a particular logical storage volume may be specified by a parameter in a configuration object that maps that logical storage volume to that host group. As such, a management entity may be able to perform non-disruptive path management at a logical storage volume level of granularity. According to some such techniques, the available paths to a particular logical storage volume may automatically be adjusted in conjunction with a mobility event, such that hosts authorized to access the logical storage volume are provided with optimized access paths.

Figure 3:
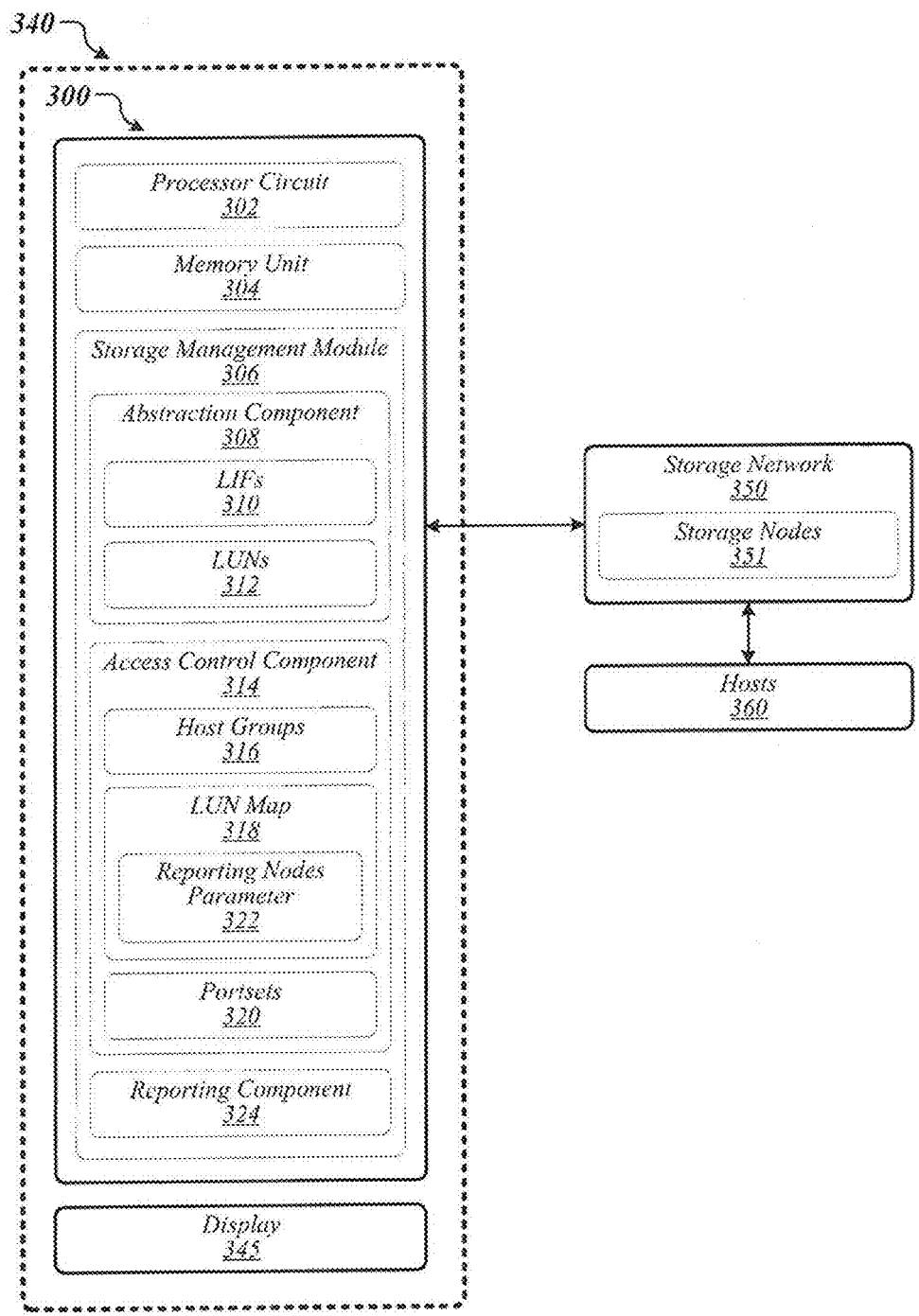
FIG. 3 illustrates one embodiment of an apparatus and one embodiment of a first system.

FIG. 3 illustrates a block diagram of an apparatus 300 such as may implement improved access management techniques. Apparatus 300 may comprise an example of management entity 206 of FIG. 2 according to some embodiments. As shown in FIG. 3, apparatus 300 comprises multiple elements including a processor circuit 302, a memory unit 304, and a storage management module 306. The embodiments, however, are not limited to the type, number, or arrangement of elements shown in this figure.

In various embodiments, apparatus 300 may comprise processor circuit 302. Processor circuit 302 may be implemented using any processor or logic device, such as a complex instruction set computer (CISC) microprocessor, a reduced instruction set computing (RISC) microprocessor, a very long instruction word (VLIW) microprocessor, an x86 instruction set compatible processor, a processor implementing a combination of instruction sets, a multi-core processor such as a dual-core processor or dual-core mobile processor, or any other microprocessor or central processing unit (CPU). Processor circuit 302 may also be implemented as a dedicated processor, such as a controller, a microcontroller, an embedded processor, a chip multiprocessor (CMP), a co-processor, a digital signal processor (DSP), a network processor, a media processor, an input/output (I/O) processor, a media access control (MAC) processor, a radio baseband processor, an application specific integrated circuit (ASIC), a field programmable gate array (FPGA), a programmable logic device (PLD), and so forth. The embodiments are not limited in this context.

In some embodiments, apparatus 300 may comprise or be arranged to communicatively couple with a memory unit 304. Memory unit 304 may be implemented using any machine-readable or computer-readable media capable of storing data, including both volatile and non-volatile memory. For example, memory unit 304 may include read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. It is worthy of note that some portion or all of memory unit 304 may be included on the same integrated circuit as processor circuit 302, or alternatively some portion or all of memory unit 304 may be disposed on an integrated circuit or other medium, for example a hard disk drive, that is external to the integrated circuit of processor circuit 302. Although memory unit 304 is comprised within apparatus 300 in FIG. 3, memory unit 304 may be external to apparatus 300 in some embodiments. The embodiments are not limited in this context.

In various embodiments, apparatus 300 may comprise a storage management module 306. Storage management module 306 may comprise logic, circuitry, and/or instructions operative to enable the use of a storage network 350 by one or more hosts 360. In some embodiments, storage management module 306 may perform various operations in order to control access to the storage network 350 and/or implement abstraction of the storage network 350. The embodiments are not limited in this context.

FIG. 3 also illustrates a block diagram of a system 340. System 340 may comprise any of the aforementioned elements of apparatus 300. System 340 may further comprise a display 345. Display 345 may comprise any display device capable of displaying information received from processor circuit 302. Examples for display 345 may include a television, a monitor, a projector, and a computer screen. In one embodiment, for example, display 345 may be implemented by a liquid crystal display (LCD), light emitting diode (LED) or other type of suitable visual interface. Display 345 may comprise, for example, a touch-sensitive display screen ("touchscreen"). In various implementations, display 345 may comprise one or more thin-film transistors (TFT) LCD including embedded transistors. The embodiments, however, are not limited to these examples.

In general operation, apparatus 300 and/or system 340 may be operative to implement, manage, monitor, and/or control a storage network 350, which may comprise a SAN cluster in various embodiments. In various embodiments, apparatus 300 and/or system 340 may be operative to implement various types of abstraction in order to present the storage network 350 to one or more hosts 360 as a virtual storage array, such as virtual storage array 204 of FIG. 2. In some such embodiments, the storage network 350 may comprise a plurality of storage nodes 351, but may appear from the perspective of the hosts 360 to be a single storage device or node. It is worthy of note that although apparatus 300 and system 340 are depicted as being external to storage network 350 in FIG. 3, the embodiments are no so limited. In various embodiments, for example, apparatus 300 and system 340 may comprise a storage node 351 or other device within storage network 350. The embodiments are not limited in this context.

In some embodiments, storage management module 306 may comprise an abstraction component 308. Abstraction component 308 may comprise logic, circuitry, and/or instructions operative to implement and/or manage one or more storage network abstraction features. In various embodiments, abstraction component 308 may be operative to implement interface abstraction for storage network 350. In some such embodiments, abstraction component 308 may be operative to define a set of logical interfaces (LIFs) 310 for storage network 350 and map the LIFs 310 to physical ports of the various storage nodes 351 of storage network 350. In various embodiments, the mapping between LIFs 310 and the physical ports of storage nodes 351 may be opaque to the hosts 360, such that each LIF 310 appears to be a substantially equivalent path for accessing storage of the storage network 350. The embodiments are not limited in this context.

In some embodiments, abstraction component 308 may be operative to implement storage abstraction for storage network 350. In various such embodiments, abstraction component 308 may be operative to define one or more logical storage volumes for storage network 350, and to map each logical storage volume to respective physical storage within one or more storage nodes 351. In some embodiments, abstraction component 308 may be operative to define a logical unit number (LUN) 312 for each such logical storage volume. In various embodiments, the mapping between logical storage volumes and physical storage locations may be opaque to the hosts 360, such that storage network 350 appears to be a single storage device or node comprising the logical storage volumes identified by LUNs 312. The embodiments are not limited in this context.

In some embodiments, storage management module 306 may comprise an access control component 314. Access control component 314 may comprise logic, circuitry, and/or instructions operative to enable and/or manage access to storage network 350 by hosts 360. In various embodiments, access control component 314 may be operative to enable and/or manage such access in concert with abstraction implemented by abstraction component 308. In some embodiments, access control component 314 may be operative to define which LIFs 310 may be used by particular hosts 360 to access storage network 350. In various embodiments, access control component 314 may be operative to define which LUNs 312 will be made available for access by particular hosts 360. The embodiments are not limited in this context.

In some embodiments, in conjunction with enabling and/or managing access to storage network 350, access control component 314 may be operative to define one or more host groups 316. Each host group 316 may comprise a defined set of one or more hosts 360. In various embodiments, access control component 314 may be operative to enable and/or manage one or more aspects of access to storage network 350 at host group level of granularity. For example, in some embodiments, access control component 314 may be operative to enable host access to any particular LUN 312 on a host group by host group basis. The embodiments are not limited to this example.

In various embodiments, in order to enable the hosts 360 of a particular host group 316 to access a particular LUN 312, access control component 314 may be operative to generate a LUN map 318. LUN map 318 may comprise information identifying the LUN 312 and the host group 316, and indicating that the hosts 360 of the host group 316 are to be provided with access to the LUN 312. The embodiments are not limited in this context.

In some embodiments, when access control component 314 generates a LUN map 318 to enable a host group 316 to access a LUN 312, the hosts 360 of that host group 316 may by default be able to access the LUN 312 via any LIF 310. However, in various embodiments, this default condition may be unsuitable. In some embodiments, there may be a limit to the number of LIFs 310 that the hosts 360 in host group 316 can properly handle as a collective set of paths through which to access a given LUN 312. In various such embodiments, the default condition according to which the LUN 312 is presented on all LIFs 310 may exceed this limit. In an example embodiment, each host 360 may be capable of properly handling as many as eight LIFs 310 for a given LUN 312, but the set of LIFs 310 may comprise two LIFs for each of eight storage nodes 351, and thus the default condition may involve presenting the LUN 312 on sixteen LIFs 310. The embodiments are not limited to this example.

In some embodiments, access control component 314 may be capable of generating one or more portsets 320 in order to limit the number of LIFs presented to various host groups 316 as paths for accessing LUNs 312 mapped to those host groups 316. Each portset 320 may comprise information identifying a subset of LIFs 310. In various embodiments, access control component 314 may be capable of mapping a portset 320 to a host group 316 in order to define the LIFs 310 that the hosts 360 of that host group 316 may utilize as paths for accessing any LUNs 312 that are mapped to that host group 316. In some embodiments, once access control component 314 maps a portset 320 to a host group 316, the hosts 360 of that host group 316 may only be able to utilize the particular LIFs 310 identified in the portset 320 when accessing the LUNs 312 that are mapped to their host group 316. The embodiments are not limited in this context.

In various embodiments, each portset 320 may be host group-specific but not LUN-specific. As such, in some embodiments, when access control component 314 maps a portset 320 to a host group 316, the hosts 360 of that host group 316 may be restricted to using only the LIFs 310 identified in the portset 320 to access any of LUNs 312. In other words, in various embodiments, the granularity associated with the use of portsets 320 may be such that different access paths cannot be enabled for a given host group 316 to access different LUNs 312. The embodiments are not limited in this context.

In some embodiments, it may be desirable for access control component 314 to specify the acceptable access paths from hosts 360 to LUNs 312 at a host-storage node-LUN level of granularity. In various embodiments, access control component 314 may be operative to perform path control for a given LUN 312 and host group 316 using a reporting nodes parameter 322 comprised in the LUN map 318 that maps the LUN 312 to the host group 316. In some embodiments, the reporting nodes parameter 322 may define the storage nodes 351 via which the LUN 312 is made available to the host group 316. In various embodiments, the host group 316 may be able to use only the LIFs 310 associated with the storage nodes 351 identified by reporting nodes parameter 322 to access the LUN 312. The embodiments are not limited in this context.

In some embodiments, access control component 314 may be operative to generate the reporting nodes parameter 322 for each LUN map 318 based on a convention that a particular LUN 312 is to be presented only via the LIFs 310 associated with the owner node of the LUN 312 and the partner node(s) for the owner node. In various embodiments, when it generates a LUN map 318, access control component 314 may be operative to determine an owner node of the associated LUN 312, determine one or more partner node(s) for the owner node, and generate a reporting nodes parameter 322 that identifies the owner node and the partner node(s). In various embodiments, access control component 314 may be operative in some cases to specify additional reporting nodes when generating the reporting nodes parameter 322 for a given LUN map 318. For example, if the mobility domain for a LUN 312 is known at the time that its associated LUN map 318 is generated, access control component 314 may be operative to generate the reporting nodes parameter 322 for that LUN map 318 such that it identifies not only the current owner node and partner node(s) for the LUN 312, but also one or more additional nodes within its mobility domain. The embodiments are not limited to this example.

In some embodiments, storage management module 306 may comprise a reporting component 324. Reporting component 324 may comprise logic, circuitry, and/or instructions operative to report the availability of LUNs 312 to host groups 316 to which they are mapped. More particularly, in various embodiments, for a given host group 316 to which a given LUN 312 is mapped, reporting component 324 may be operative to report to that host group 316 the LIFs 310 via which that LUN 312 is accessible. In some embodiments, reporting component 324 may be operative to determine those LIFs 310 based on reporting nodes parameter 322. In various embodiments, for example, reporting component 324 may be operative to report only the LIFs 310 associated with the storage nodes 351 identified by the reporting nodes parameter 322. The embodiments are not limited in this context.

In some embodiments, when a mobility event occurs according to which a LUN 312 is relocated, access control component 314 may be operative to automatically update the reporting nodes parameter 322 in a LUN map 318 associated with that LUN 312. In various embodiments, for example, access control component 314 may be operative to automatically update the reporting nodes parameter 322 such that it identifies a new owner node and partner node(s) for the relocated LUN 312. In various embodiments, access control component 314 may be operative to update the reporting nodes parameter 322 using an add-new-reporting-nodes procedure. In some embodiments, the add-new-reporting-nodes procedure may be exposed for invocation via command-line interface (CLI) and/or application programming interface (API) commands. In some embodiments, once reporting nodes parameter 322 has been updated, reporting component 324 may then report the LIFs 310 associated with the new owner node and partner node(s) for the relocated LUN 312. As such, a host group 316 to which the LUN 312 is mapped may be provided with one or more optimized paths for accessing the LUN 312 following the mobility event. The embodiments are not limited in this context.

In various embodiments, access control component 314 may be operative to utilize portsets 320 in combination with reporting nodes parameter 322 to observe path limits for host groups 316. In some embodiments, the number of LIFs 310 associated with each storage node 351 may be such that even when a given LUN 312 is presented only out of its owner node and partner node(s), the number of corresponding LIFs 310 exceeds a limit for the host group 316. In various embodiments, access control component 314 may be operative to define portsets 320 such that only a subset of the LIFs 310 for each storage nodes 351 may be presented to each host group 316. In some such embodiments, reporting component 324 may be operative to report a set of LIFs 310 comprising the intersection of the set of LIFs 310 defined by the portset 320 and the set of LIFs 310 associated with the storage nodes 351 identified by the reporting nodes parameter 322.

In an example embodiment, storage network 350 may comprise eight storage nodes 351, each of which may have 32 associated LIFs 310, while the hosts of a host group 316 may be limited to eight LIFs 310 for any LUN 312. Access control component 314 may define a portset 320 that specifies, for each storage node 351, four LIFs 310 that may be used by the host group 316. For a given LUN 312, reporting nodes parameter 322 may identify an owner node and one or more partner node(s). When reporting the availability of the LUN 312 to the host group 316, reporting component 324 may be operative to determine the intersection of the set of 32 LIFs 310 defined by the portset 320 and the set of 64 LIFs 310 associated with the owner node and the partner node(s) identified by the reporting nodes parameter 322. In this example, that intersection comprises eight LIFs 310, and reporting component 324 may be operative to report those eight LIFs 310 to the host group 316. The embodiments are not limited to this example.

Operations for the above embodiments may be further described with reference to the following figures and accompanying examples. Some of the figures may include a logic flow. Although such figures presented herein may include a particular logic flow, it can be appreciated that the logic flow merely provides an example of how the general functionality as described herein can be implemented. Further, the given logic flow does not necessarily have to be executed in the order presented unless otherwise indicated. In addition, the given logic flow may be implemented by a hardware element, a software element executed by a processor, or any combination thereof. The embodiments are not limited in this context.

Figure 4:
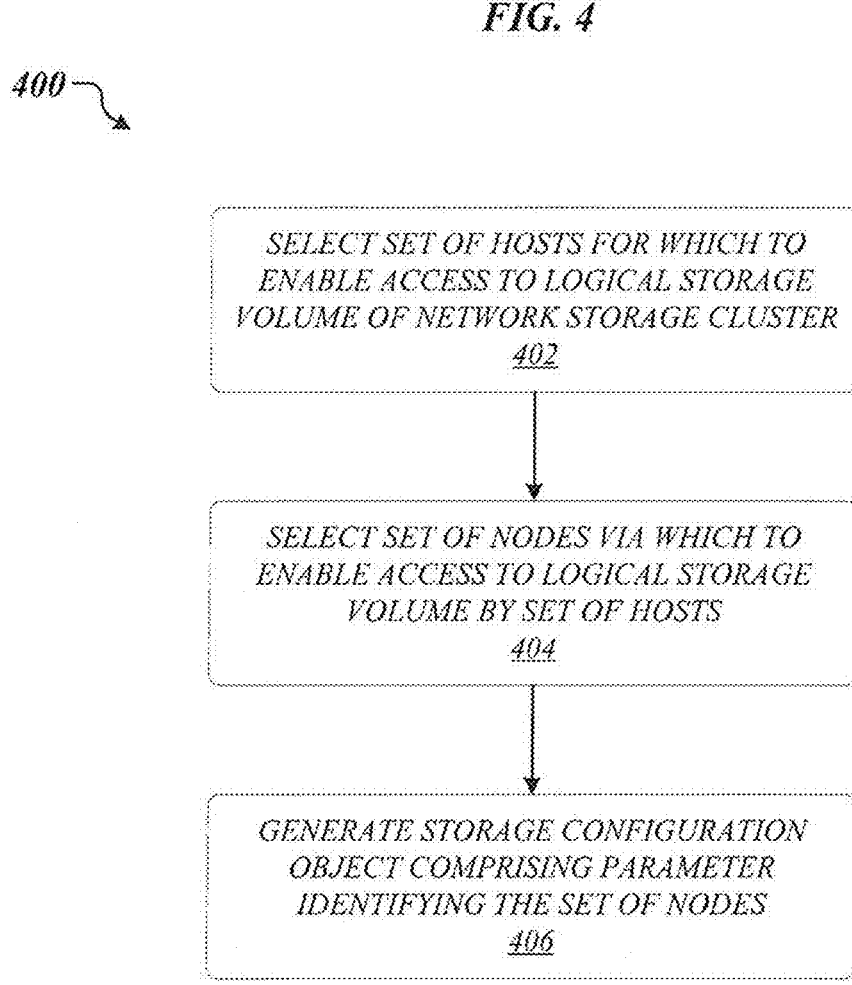
FIG. 4 illustrates one embodiment of a logic flow.

FIG. 4 illustrates one embodiment of a logic flow 400, which may be representative of the operations executed by one or more embodiments described herein. As shown in logic flow 400, at 402, a set of hosts for which to enable access to a logical storage volume of a network storage cluster may be selected. For example, access control component 314 of FIG. 3 may be operative to select a host group 316 for which to enable access to a LUN 312. At 404, a set of nodes via which to enable access to the logical storage volume by the set of hosts may be selected. For example, access control component 314 of FIG. 3 may be operative to select a set of hosts comprising an owner node for the LUN 312 and one or more partner node(s) of that owner node. At 406, a storage configuration object may be generated that comprises a parameter identifying the selected set of nodes. For example, access control component 314 of FIG. 3 may be operative to generate a LUN map 318 comprising a reporting nodes parameter 322 that identifies the owner node for the LUN 312 and the partner node(s) of that owner node. The embodiments are not limited to these examples.

Figure 5:
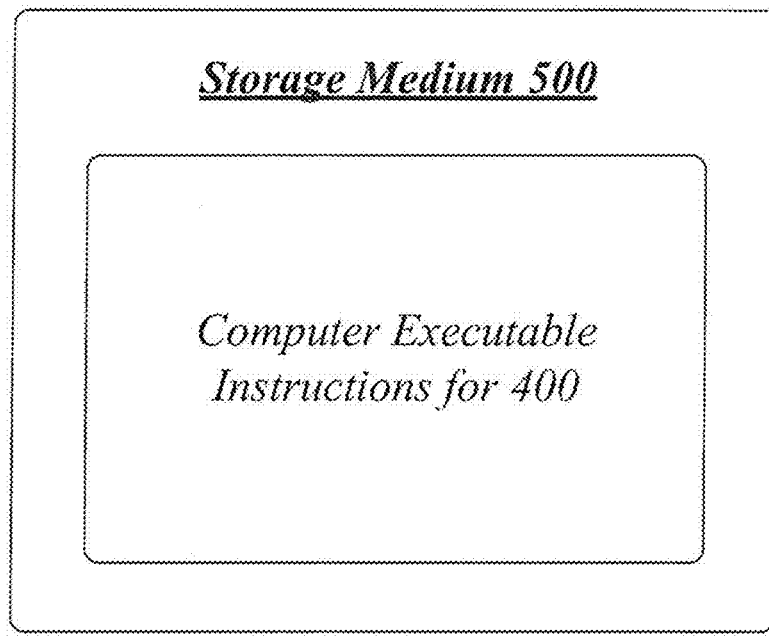
FIG. 5 illustrates one embodiment of a storage medium.

FIG. 5 illustrates an embodiment of a storage medium 500. Storage medium 500 may comprise any non-transitory computer-readable storage medium or machine-readable storage medium, such as an optical, magnetic or semiconductor storage medium. In various embodiments, storage medium 500 may comprise an article of manufacture. In some embodiments, storage medium 500 may store computer-executable instructions, such as computer-executable instructions to implement logic flow 400 of FIG. 4. Examples of a computer-readable storage medium or machine-readable storage medium may include any tangible media capable of storing electronic data, including volatile memory or non-volatile memory, removable or non-removable memory, erasable or non-erasable memory, writeable or re-writeable memory, and so forth. Examples of computer-executable instructions may include any suitable type of code, such as source code, compiled code, interpreted code, executable code, static code, dynamic code, object-oriented code, visual code, and the like. The embodiments are not limited in this context.

Figure 6:
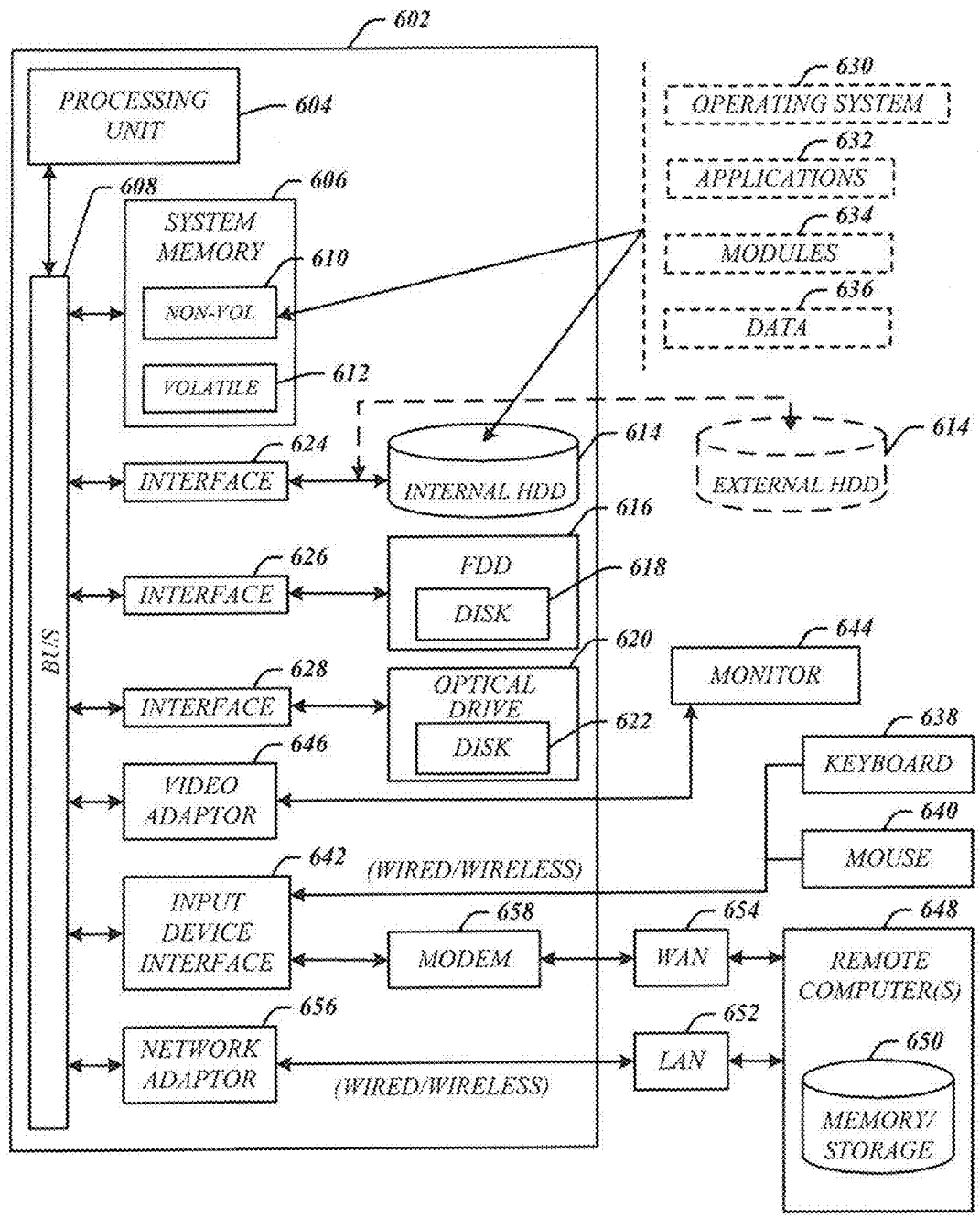
FIG. 6 illustrates one embodiment of a computing architecture.

FIG. 6 illustrates an embodiment of an exemplary computing architecture 600 suitable for implementing various embodiments as previously described. In various embodiments, the computing architecture 600 may comprise or be implemented as part of an electronic device. In some embodiments, the computing architecture 600 may be used, for example, to implement apparatus 300 and/or system 340 of FIG. 3, logic flow 400 of FIG. 4, and/or storage medium 500 of FIG. 5. The embodiments are not limited in this context.

As used in this application, the terms "system" and "component" and "module" are intended to refer to a computer-related entity, either hardware, a combination of hardware and software, software, or software in execution, examples of which are provided by the exemplary computing architecture 600. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 600 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 600.

As shown in FIG. 6, the computing architecture 600 comprises a processing unit 604, a system memory 606 and a system bus 608. The processing unit 604 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 604.

The system bus 608 provides an interface for system components including, but not limited to, the system memory 606 to the processing unit 604. The system bus 608 can be any of several types of bus structure that may further interconnect to a memory bus (with or without a memory controller), a peripheral bus, and a local bus using any of a variety of commercially available bus architectures. Interface adapters may connect to the system bus 608 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The system memory 606 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 6, the system memory 606 can include non-volatile memory 610 and/or volatile memory 612. A basic input/output system (BIOS) can be stored in the non-volatile memory 610.

The computer 602 may include various types of computer-readable storage media in the form of one or more lower speed memory units, including an internal (or external) hard disk drive (HDD) 614, a magnetic floppy disk drive (FDD) 616 to read from or write to a removable magnetic disk 618, and an optical disk drive 620 to read from or write to a removable optical disk 622 (e.g., a CD-ROM or DVD). The HDD 614, FDD 616 and optical disk drive 620 can be connected to the system bus 608 by a HDD interface 624, an FDD interface 626 and an optical drive interface 628, respectively. The HDD interface 624 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 610, 612, including an operating system 630, one or more application programs 632, other program modules 634, and program data 636. In one embodiment, the one or more application programs 632, other program modules 634, and program data 636 can include, for example, the various applications and/or components of the apparatus 300.

A user can enter commands and information into the computer 602 through one or more wire/wireless input devices, for example, a keyboard 638 and a pointing device, such as a mouse 640. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 604 through an input device interface 642 that is coupled to the system bus 608, but can be connected by other interfaces such as a parallel port, IEEE 1394 serial port, a game port, a USB port, an IR interface, and so forth.

A monitor 644 or other type of display device is also connected to the system bus 608 via an interface, such as a video adaptor 646. The monitor 644 may be internal or external to the computer 602. In addition to the monitor 644, a computer typically includes other peripheral output devices, such as speakers, printers, and so forth.

The computer 602 may operate in a networked environment using logical connections via wire and/or wireless communications to one or more remote computers, such as a remote computer 648. The remote computer 648 can be a workstation, a server computer, a router, a personal computer, portable computer, microprocessor-based entertainment appliance, a peer device or other common network node, and typically includes many or all of the elements described relative to the computer 602, although, for purposes of brevity, only a memory/storage device 650 is illustrated. The logical connections depicted include wire/wireless connectivity to a local area network (LAN) 652 and/or larger networks, for example, a wide area network (WAN) 654. Such LAN and WAN networking environments are commonplace in offices and companies, and facilitate enterprise-wide computer networks, such as intranets, all of which may connect to a global communications network, for example, the Internet.

When used in a LAN networking environment, the computer 602 is connected to the LAN 652 through a wire and/or wireless communication network interface or adaptor 656. The adaptor 656 can facilitate wire and/or wireless communications to the LAN 652, which may also include a wireless access point disposed thereon for communicating with the wireless functionality of the adaptor 656.

When used in a WAN networking environment, the computer 602 can include a modem 658, or is connected to a communications server on the WAN 654, or has other means for establishing communications over the WAN 654, such as by way of the Internet. The modem 658, which can be internal or external and a wire and/or wireless device, connects to the system bus 608 via the input device interface 642. In a networked environment, program modules depicted relative to the computer 602, or portions thereof, can be stored in the remote memory/storage device 650. It will be appreciated that the network connections shown are exemplary and other means of establishing a communications link between the computers can be used.

The computer 602 is operable to communicate with wire and wireless devices or entities using the IEEE 802 family of standards, such as wireless devices operatively disposed in wireless communication (e.g., IEEE 802.16 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 7:
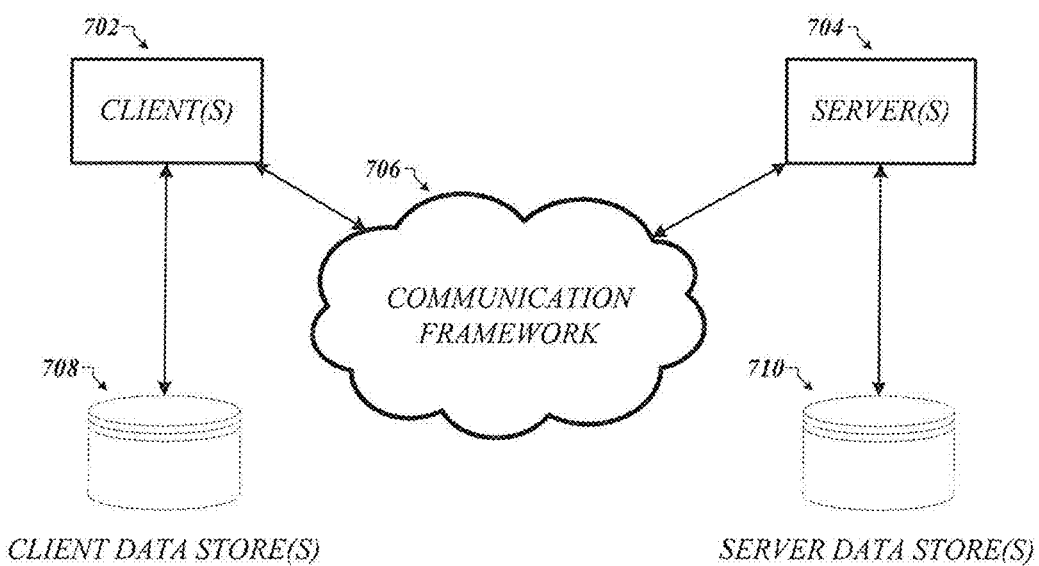
FIG. 7 illustrates one embodiment of a communications architecture.

FIG. 7 illustrates a block diagram of an exemplary communications architecture 700 suitable for implementing various embodiments as previously described. The communications architecture 700 includes various common communications elements, such as a transmitter, receiver, transceiver, radio, network interface, baseband processor, antenna, amplifiers, filters, power supplies, and so forth. The embodiments, however, are not limited to implementation by the communications architecture 700.

As shown in FIG. 7, the communications architecture 700 comprises includes one or more clients 702 and servers 704. The clients 702 and the servers 704 are operatively connected to one or more respective client data stores 708 and server data stores 710 that can be employed to store information local to the respective clients 702 and servers 704, such as cookies and/or associated contextual information. Any one of clients 702 and/or servers 704 may implement apparatus 300 and/or system 340 of FIG. 3, logic flow 400 of FIG. 4, and/or storage medium 500 of FIG. 5 in conjunction with storage of information on any of client data stores 708 and/or server data stores 710.

The clients 702 and the servers 704 may communicate information between each other using a communication framework 706. The communications framework 706 may implement any well-known communications techniques and protocols. The communications framework 706 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 706 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 702 and the servers 704. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Numerous specific details have been set forth herein to provide a thorough understanding of the embodiments. It will be understood by those skilled in the art, however, that the embodiments may be practiced without these specific details. In other instances, well-known operations, components, and circuits have not been described in detail so as not to obscure the embodiments. It can be appreciated that the specific structural and functional details disclosed herein may be representative and do not necessarily limit the scope of the embodiments.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

It is emphasized that the Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A non-transitory machine-readable medium having stored thereon instructions for performing a method comprising executable code that, when executed by at least one machine, causes the machine to:

select one or more clients for which to enable access to a logical storage volume of a network storage cluster and a first set of a plurality of nodes of the network storage cluster via which to enable access to the logical storage volume by the one or more clients;

generate a storage configuration object comprising a parameter identifying the first set of nodes as associated with the logical storage volume, wherein the first set of nodes comprises an owner node of the logical storage volume and a partner node of the owner node, the owner node and the partner node comprising a high-availability pair; and report a first set of logical interfaces (LIFs) to the one or more clients, the first set of LIFs determined based on the association of the first set of nodes and the logical volume in the storage configuration object and corresponding to one or more ports of the first set of nodes via which the one or more clients can access the logical storage volume.

2. The non-transitory machine-readable medium of claim 1, wherein the logical storage volume is coupled to at least one node of the first set of nodes via a cluster interconnect.

3. The non-transitory machine-readable medium of claim 2, the first set of nodes exclusively comprising the owner node and the partner node.

4. The non-transitory machine-readable medium of claim 1, the storage configuration object identifying a logical unit number (LUN) of the logical storage volume as associated with the first set of nodes.

5. The non-transitory machine-readable medium of claim 1, wherein the machine executable code when executed by the machine, further causes the machine to:

migrate the logical storage volume from a first node in the first set of nodes to a second node in a second set of the plurality of nodes of the network storage cluster, the second set of nodes different from the first set of nodes;

update the storage configuration object to associate the second set of nodes with the logical storage volume instead of the first set of nodes; and report a second set of LIFs determined based on the updated storage configuration object to the one or more clients.

6. The non-transitory machine-readable medium of claim 1, wherein the machine executable code when executed by the machine, further causes the machine to generate a group configuration object identifying the one or more clients, the storage configuration object comprising information associating the group configuration object with the logical storage volume.

7. A computing device, comprising:
a memory containing a machine readable medium comprising machine executable code having stored thereon instructions for performing a method of providing data sessions with clients that access data containers of a shared storage; and
a processor coupled to the memory, the processor configured to execute the machine executable code to cause the processor to:
select one or more clients for which to enable access to a logical storage volume of a network storage cluster and a first set of a plurality of nodes of the network storage cluster via which to enable access to the logical storage volume by the one or more clients;
generate a storage configuration object comprising a parameter identifying the first set of nodes as associated with the logical storage volume, wherein the first set of nodes comprises an owner node of the logical storage volume and a partner node of the owner node, the owner node and the partner node comprising a high-availability pair; and
report a first set of logical interfaces (LIFs) to the one or more clients, the first set of LIFs determined based on the association of the first set of nodes and the logical volume in the storage configuration object and corresponding to one or more ports of the first set of nodes via which the one or more clients can access the logical storage volume.

8. The computing device of claim 7, wherein the logical storage volume is coupled to at least one node of the first set of nodes via a cluster interconnect.

9. The computing device of claim 8, the first set of nodes exclusively comprising the owner node and the partner node.

10. The computing device of claim 7, the storage configuration object identifying a logical unit number (LUN) of the logical storage volume as associated with the first set of nodes.

11. The computing device of claim 7, the processor further configured to execute the machine executable code to cause the processor to:
migrate the logical storage volume from a first node in the first set of nodes to a second node in a second set of the plurality of nodes of the network storage cluster, the second set of nodes different from the first set of nodes;
update the storage configuration object to associate the second set of nodes with the logical storage volume instead of the first set of nodes; and
report a second set of LIFs determined based on the updated storage configuration object to the one or more clients.

12. The computing device of claim 7, processor further configured to execute the machine executable code to cause the processor to generate a group configuration object identifying the one or more clients, the storage configuration object comprising information associating the group configuration object with the logical storage volume.

13. A method, comprising:
selecting, by the computing device, one or more clients for which to enable access to a logical storage volume of a network storage cluster and a first set of a plurality of nodes of the network storage cluster via which to enable access to the logical storage volume by the one or more clients;
generating, by the computing device, a storage configuration object comprising a parameter identifying the first set of nodes as associated with the logical storage volume, wherein the first set of nodes comprises an owner node of the logical storage volume and a partner node of the owner node, the owner node and the partner node comprising a high-availability pair; and
reporting, by the computing device, a first set of logical interfaces (LIFs) to the one or more clients, the first set of LIFs determined based on the association of the first set of nodes and the logical volume in the storage configuration object and corresponding to one or more ports of the first set of nodes via which the one or more clients can access the logical storage volume.

14. The method of claim 13, wherein the logical storage volume is coupled to at least one node of the first set of nodes via a cluster interconnect.

15. The method of claim 14, the first set of nodes exclusively comprising the owner node and the partner node.

16. The method of claim 13, the storage configuration object identifying a logical unit number (LUN) of the logical storage volume as associated with the first set of nodes.

17. The method of claim 13, further comprising:
- migrating, by the computing device, the logical storage volume from a first node in the first set of nodes to a second node in a second set of the plurality of nodes of the network storage cluster, the second set of nodes different from the first set of nodes;
- updating, by the computing device, the storage configuration object to associate the second set of nodes with the logical storage volume instead of the first set of nodes; and
- reporting, by the computing device, a second set of LIFs determined based on the updated storage configuration object to the one or more clients.

18. The method of claim 13, further comprising generating, by the computing device, a group configuration object identifying the one or more clients, the storage configuration object comprising information associating the group configuration object with the logical storage volume.

* * * * *